United States Patent
Harada et al.

(10) Patent No.: US 9,976,478 B2
(45) Date of Patent: May 22, 2018

(54) SOLAR HEAT TURBINE SYSTEM, AND DEVICE AND METHOD FOR CONTROLLING SAID SYSTEM

(71) Applicant: MITSUBISHI HEAVY INDUSTRIES, LTD., Tokyo (JP)

(72) Inventors: Shoichi Harada, Tokyo (JP); Kazuya Higashi, Tokyo (JP); Takashi Sonoda, Tokyo (JP); Keisuke Yamamoto, Tokyo (JP); Yoshifumi Iwasaki, Tokyo (JP); Tatsuya Iwasaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 128 days.

(21) Appl. No.: 15/022,084

(22) PCT Filed: Oct. 10, 2013

(86) PCT No.: PCT/JP2013/077585
§ 371 (c)(1),
(2) Date: Mar. 15, 2016

(87) PCT Pub. No.: WO2015/052810
PCT Pub. Date: Apr. 16, 2015

(65) Prior Publication Data
US 2016/0222882 A1 Aug. 4, 2016

(51) Int. Cl.
*F02C 1/05* (2006.01)
*F03G 6/06* (2006.01)
(Continued)

(52) U.S. Cl.
CPC ............. *F02C 1/05* (2013.01); *F01K 5/00* (2013.01); *F01K 13/02* (2013.01); *F03G 6/00* (2013.01);
(Continued)

(58) Field of Classification Search
CPC ... F02C 1/05; F03G 6/064; F03G 6/00; F03G 6/065; F01K 5/00; F01K 13/02;
(Continued)

(56) References Cited

U.S. PATENT DOCUMENTS 4,942,736 A * 7/1990 Bronicki ............... F02C 1/05
60/641.12
5,444,972 A * 8/1995 Moore .................. F02C 1/05
60/39.182
(Continued)

FOREIGN PATENT DOCUMENTS

JP 9-280664 A 10/1997
JP 2756213 B2 5/1998
(Continued)

OTHER PUBLICATIONS

International search report dated Jan. 7, 2014, issued in counterpart International Application No. PCT/JP2013/077585 (4 pages).
(Continued)

*Primary Examiner* — Hoang Nguyen
(74) *Attorney, Agent, or Firm* — Westerman, Hattori, Daniels & Adrian, LLP

(57) ABSTRACT

A solar heat turbine system includes: a compressor which compresses a working fluid, and generates a high-pressure working fluid; a solar heat receiver which heats the high-pressure working fluid with solar heat, and which generates a high-temperature working fluid; a turbine which is rotationally driven by the high-temperature working fluid; a restriction mechanism which restricts a flow of at least one of the high-pressure working fluid and the high-temperature working fluid; a rotation interlocking mechanism which rotationally drives the compressor so as to interlock with the turbine; a bleed mechanism which causes the high-pressure working fluid which is in a process of being generated in the compressor to be bled as a bled working fluid; and a system
(Continued)

control unit which causes the bleed mechanism to execute bleeding after the restriction mechanism is caused to restrict.

10 Claims, 6 Drawing Sheets

(51) Int. Cl.
  *F01K 13/02* (2006.01)
  *F03G 6/00* (2006.01)
  *F01K 5/00* (2006.01)
  *F24J 2/07* (2006.01)
(52) U.S. Cl.
  CPC ............ *F03G 6/064* (2013.01); *F03G 6/065* (2013.01); *F05D 2270/101* (2013.01); *F05D 2270/306* (2013.01); *F24J 2/07* (2013.01); *Y02E 10/46* (2013.01)
(58) Field of Classification Search
  CPC ......... F05D 2270/306; F05D 2270/101; Y02E 10/46; F24J 2/07
  USPC .......... 60/641.8–641.15, 650, 660, 661, 666, 60/682–684
  See application file for complete search history.

(56) References Cited

U.S. PATENT DOCUMENTS

| | | | | |
|---|---|---|---|---|
| 2011/0259007 A1* | 10/2011 | Aoyama | .................. | F02C 1/05 60/641.14 |
| 2013/0147197 A1* | 6/2013 | Goebel | ..................... | F01K 3/12 290/52 |
| 2014/0360188 A1* | 12/2014 | Harada | .................. | F02C 7/275 60/641.14 |

FOREIGN PATENT DOCUMENTS

| | | |
|---|---|---|
| JP | 2002-098416 A | 4/2002 |
| JP | 2005-233157 A | 9/2005 |
| JP | 2010-275996 A | 12/2010 |
| JP | 2013-147996 A | 8/2013 |
| JP | 2013-224602 A | 10/2013 |
| WO | 2010/140565 A1 | 12/2010 |

OTHER PUBLICATIONS

Translation of the Written Opinion dated Jan. 7, 2014, issued in counterpart International Patent Application No. PCT/JP2013/077585 (15 pages).

* cited by examiner

SOLAR HEAT TURBINE SYSTEM, AND DEVICE AND METHOD FOR CONTROLLING SAID SYSTEM

TECHNICAL FIELD

The present invention relates to a solar heat turbine system which generates electric power by driving a turbine generator with the heat energy of focused sunlight, and a device and a method for controlling the system.

BACKGROUND ART

At present, various power generating systems are utilized. However, from an ecological point of view, the use of natural energy attracts attention. For example, a tower type solar heat turbine system generates heat energy by reflecting sunlight by a heliostat composed of a plurality of reflecting mirrors installed on the ground, thereby focusing sunlight on a solar heat receiver of an upper portion of a tower installed on the ground.

In such a tower type solar heat turbine system, a high-pressure working fluid is generated by compressing a working fluid such as air in a compressor which is rotationally driven. The high-pressure working fluid is heated in the solar heat receiver, whereby a high-temperature working fluid is generated.

The high-temperature working fluid rotationally drives a turbine. The compressor and a turbine generator are rotationally driven by the turbine, and therefore, electric power is generated with this (refer to, for example, Patent Documents 1 to 3).

Further, in the solar heat turbine systems as described above, there is also a solar heat turbine system in which a part of a high-pressure working fluid which is in a process of being compressed in a compressor is bled as a bled working fluid. Further, as the solar heat turbine system, in addition to the tower type described above, there are a trough type, a beam-down type, and the like.

However, in the solar heat turbine system as described above, for example, there is a case where a so-called trip in which an electrical load connected to the turbine generator disappears due to abnormality or the like of the turbine system or an electrical system occurs. In this case, a mechanical load acting on the turbine generator is also rapidly reduced, and therefore, there is a case where so-called over-speed or surging is generated in the turbine generator.

Therefore, Patent Document 3 discloses causing a high-pressure working fluid to bypass a solar heat receiver from a compressor to a turbine, discharging the high-pressure working fluid from the compressor to the outside, and restricting the high-pressure working fluid which flows from the compressor to the solar heat receiver, if a trip occurs.

PRIOR ART DOCUMENT

Patent Document

[Patent Document 1] Japanese Unexamined Patent Application, First Publication No. 2002-98416
[Patent Document 2] Japanese Unexamined Patent Application, First Publication No. H09-280664
[Patent Document 3] Japanese Unexamined Patent Application, First Publication No. 2010-275996

SUMMARY OF THE INVENTION

Problem to be Solved by the Invention

In the solar heat turbine system according to the invention described in Patent Document 3, it is possible to quickly restrict an increase in the rotation speed of the turbine, the compressor, and the turbine generator.

However, if the high-pressure working fluid is discharged from the compressor to the outside, the internal pressure of the compressor is rapidly reduced, and therefore, even though surging can be prevented, it becomes easy for over-speed to occur. On the other hand, if the high-pressure working fluid flowing from the compressor to the solar heat receiver is restricted, the internal pressure of the compressor increases, and therefore, even though over-speed can be prevented, it becomes easy for surging to occur.

That is, in the invention described in Patent Document 3, it is difficult to stably stop the solar heat turbine system while satisfactorily preventing both over-speed and surging.

The present invention provides a solar heat turbine system which can be stably stopped while satisfactorily preventing both over-speed and surging, when a stop request is generated, and a device and a method for controlling the system.

Means for Solving the Problem

According to a first aspect of the present invention, there is provided a solar heat turbine system including: a compressor which compresses a working fluid by rotational drive, thereby generating a high-pressure working fluid; a solar heat receiver which heats the high-pressure working fluid with solar heat, thereby generating a high-temperature working fluid; a turbine which is rotationally driven by the high-temperature working fluid; a rotation interlocking mechanism which rotationally drives the compressor so as to interlock with the turbine which is rotationally driven; a restriction mechanism which restricts a flow of at least one of the high-pressure working fluid and the high-temperature working fluid; a bleed mechanism which causes the high-pressure working fluid which is in a process of being generated in the compressor to be bled as a bled working fluid; and a system control unit for causing the bleed mechanism to execute bleeding after the restriction mechanism is caused to restrict at least one of the flows of the high-pressure working fluid and the high-temperature working fluid, if a stop request is generated.

Therefore, in this solar heat turbine system, the high-pressure working fluid generated in the compressor is heated in the solar heat receiver, whereby a high-temperature working fluid is generated, and the turbine is rotationally driven by the high-temperature working fluid. The turbine which is rotationally driven rotationally drives the compressor, and therefore, the solar heat turbine system continues to operate in a chain reaction with sunlight as an energy source.

However, in the solar heat turbine system according to the first aspect, for example, if the stop request is generated due to the occurrence of a trip or the like of the turbine generator connected to the turbine, the restrict mechanism restricts the flow of at least one of the high-pressure working fluid and the high-temperature working fluid. For this reason, if the stop request is generated, it is possible to restrict the energy of at least one of the high-pressure working fluid and the high-temperature working fluid which operate the solar heat turbine system.

At this time, bleeding is not executed immediately, and therefore, this serves as a load, whereby an increase in the rotation speed of the compressor is suppressed. On the other hand, after the flow of at least one of the high-pressure working fluid and the high-temperature working fluid is restricted, the high-pressure working fluid which is in a process of being generated in the compressor is bled as a bled working fluid, and therefore, the internal pressure of the compressor is reduced.

According to a second aspect of the present invention, in the solar heat turbine system described above, the system control unit causes the bleed mechanism to execute bleeding after the generation of the stop request. Therefore, in this solar heat turbine system, bleeding is automatically started at an appropriate timing after the stop request is generated.

According to a third aspect of the present invention, in the solar heat turbine system described above, the system control unit causes the bleed mechanism to execute bleeding in response to a timing when a rotation speed of the compressor has changed from an increase to a decrease, after the generation of the stop request. Therefore, in this solar heat turbine system, bleeding is started in response to the rotation speed of the compressor after the stop request is generated.

According to a fourth aspect of the present invention, in the solar heat turbine system described above, the bleed mechanism is caused to execute bleeding in response to a timing when a rotation speed of the compressor has been reduced to a predetermined value, after the generation of the stop request.

Therefore, in this solar heat turbine system, bleeding is started in response to the rotation speed of the compressor after the stop request is generated.

According to a fifth aspect of the present invention, the solar heat turbine system further includes a heat receiver bypass unit for causing the high-pressure working fluid to bypass the solar heat receiver from the compressor to the turbine. The system control unit operates the heat receiver bypass unit if the stop request is generated.

Therefore, in this solar heat turbine system, the high-pressure working fluid which flows from the compressor to the turbine via the solar heat receiver bypasses the solar heat receiver by the heat receiver bypass unit if the stop request is generated. For this reason, if the stop request is generated, the inflow of the high-pressure working fluid to the solar heat receiver is reduced.

According to a sixth aspect of the present invention, in the solar heat turbine system described above, the bleed mechanism has a bleed valve which discharges the high-pressure working fluid to the outside. The system control unit operates the bleed valve if the stop request is generated.

Therefore, in this solar heat turbine system, if the stop request is generated, the high-pressure working fluid flowing from the compressor to the solar heat receiver is discharged without flowing into the solar heat receiver.

For this reason, if the stop request is generated, the pressure of the high-pressure working fluid which the compressor flows out is reduced and the flow of the high-pressure working fluid which is heated by the solar heat receiver is reduced.

According to a seventh aspect of the present invention, the solar heat turbine system described above further includes a compressor inlet guide vane which regulates a flow rate of the working fluid to the compressor. The system control unit regulates the compressor inlet guide vane in a closing direction if the stop request is generated.

Therefore, in this solar heat turbine system, the compressor inlet guide vane regulates the flow rate of the working fluid to the compressor, and therefore, the flow rate of the working fluid to the compressor is appropriately adjusted. If the stop request is generated, the compressor inlet guide vane is regulated in a closing direction, and therefore, the inflow of the working fluid to the compressor is reduced.

According to an eighth aspect of the present invention, in the solar heat turbine system described above, the system control unit closes the compressor inlet guide vane after the restriction mechanism is caused to restrict at least one of the flows of the high-pressure working fluid and the high-temperature working fluid. Therefore, in this solar heat turbine system, the inflow of the working fluid to the turbine is reduced at an optimum timing.

According to a ninth aspect of the present invention, the solar heat turbine system described above further includes a generator which generates electric power by beings rotationally driven by at least one of the compressor and the turbine. Therefore, in this solar heat turbine system, it is possible to generate electric power by the heat energy of sunlight.

According to a tenth aspect of the present invention, there is provided a system control device that controls a solar heat turbine system which includes a compressor which compresses a working fluid, thereby generating a high-pressure working fluid, a solar heat receiver which heats the high-pressure working fluid with solar heat, thereby generating a high-temperature working fluid, and a turbine which is rotationally driven by the high-temperature working fluid. The system control device includes a restriction mechanism which restricts a flow of at least one of the high-pressure working fluid and the high-temperature working fluid, and a bleed mechanism which causes the high-pressure working fluid which is in a process of being generated in the compressor to be bled as a bled working fluid, wherein the bleed mechanism is caused to execute bleeding after the restriction mechanism is caused to restrict at least one of the flows of the high-pressure working fluid and the high-temperature working fluid, if a stop request is generated.

Therefore, in this system control device, for example, if the stop request is generated due to the occurrence of a trip or the like of the turbine generator connected to the turbine, the restrict mechanism restricts the flow of at least one of the high-pressure working fluid and the high-temperature working fluid. For this reason, if the stop request is generated, it is possible to restrict the energy of at least one of the high-pressure working fluid and the high-temperature working fluid which operate the solar heat turbine system.

At this time, bleeding is not executed immediately, and therefore, this serves as a load, whereby an increase in the rotation speed of the compressor is suppressed. On the other hand, after the flow of at least one of the high-pressure working fluid and the high-temperature working fluid is restricted, the high-pressure working fluid which is in a process of being generated in the compressor is bled as a bled working fluid, and therefore, the internal pressure of the compressor is reduced.

According to an eleventh aspect of the present invention, there is provided a system control method of a solar heat turbine system which includes a compressor which compresses a working fluid, thereby generating a high-pressure working fluid, a solar heat receiver which heats the high-pressure working fluid with solar heat, thereby generating a high-temperature working fluid, and a turbine which is rotationally driven by the high-temperature working fluid and coupled so as to be able to rotate along with the compressor. The solar heat turbine system includes a restriction mechanism which restricts a flow of at least one of the high-pressure working fluid and the high-temperature working fluid, and a bleed mechanism which causes the high-pressure working fluid which is in a process of being generated in the compressor to be bled as a bled working fluid. The system control method includes the step of performing a first step for restricting the flow of at least one of the high-pressure working fluid and the high-temperature working fluid by the restriction mechanism according to generation of a stop request, and the step of performing a second step for bleeding the high-pressure working fluid which is in a process of being generated in the compressor by the bleed mechanism after the first step is performed.

Therefore, in this system control method, for example, if the stop request is generated due to the occurrence of a trip or the like of the turbine generator connected to the turbine, the restrict mechanism restricts the flow of at least one of the high-pressure working fluid and the high-temperature working fluid. For this reason, if the stop request is generated, it is possible to restrict the energy of at least one of the high-pressure working fluid and the high-temperature working fluid which operate the solar heat turbine system.

At this time, bleeding is not executed immediately, and therefore, this serves as a load, whereby an increase in the rotation speed of the compressor is suppressed. On the other hand, after the flow of at least one of the high-pressure working fluid and the high-temperature working fluid is restricted, the high-pressure working fluid which is in a process of being generated in the compressor is bled as a bled working fluid, and therefore, the internal pressure of the compressor is reduced.

Further, various constituent elements related to the aspects of the present invention described above do not necessarily need to be individually independent, and a configuration in which a plurality of constituent elements are formed as a single member, a configuration in which a single constituent element is formed of a plurality of members, a configuration in which a certain constituent element is a part of another constituent element, a configuration in which a part of a certain constituent element and a part of another constituent element overlap, or the like is also acceptable.

Further, in each aspect of the present invention, the working fluid which flows from the compressor to the solar heat receiver is referred to as a "high-pressure working fluid", and the working fluid which flows from the heat receiver to the turbine is referred to as a "high-temperature working fluid".

Advantageous Effects of Invention

According to the solar heat turbine system described above, and the device and the method for controlling the system, for example, if the stop request is generated in the solar heat turbine system, the restriction mechanism restricts the flow of at least one of the high-pressure working fluid and the high-temperature working fluid. For this reason, it is possible to restrict the energy of at least one of the high-pressure working fluid and the high-temperature working fluid which operate the solar heat turbine system.

At this time, bleeding is not executed immediately, and therefore, this serves as a load, whereby an increase in the rotation speed of the compressor is suppressed, and thus it is possible to satisfactorily prevent over-speed of the solar heat turbine system.

Further, after at least one of the high-pressure working fluid and the high-temperature working fluid is restricted, the high-pressure working fluid which is in a process of being generated in the compressor is bled as a bled working fluid, and therefore, it is possible to reduce the internal pressure of the compressor in which over-speed has been prevented, and thus it is possible to satisfactorily prevent surging thereof. Therefore, in the present invention, when the stop request is generated, it is possible to stably stop the solar heat turbine system while satisfactorily preventing both over-speed and surging.

DESCRIPTION OF THE EMBODIMENTS

Next, a solar heat turbine system 1000 of an embodiment of the present invention will be hereinafter described with reference to FIGS. 1 to 6B.

The solar heat turbine system 1000 of this embodiment is formed in a tower type described above, and as shown in FIG. 3, a plurality of heliostats 1050 and a support tower 1060 are installed at a heliostat field G composed of the ground.

The heliostat 1050 has a reflecting mirror 1051 which reflects sunlight WL, and a movable support leg 1052 which movably supports the reflecting mirror 1051. The plurality of heliostats 1050 are disposed to be distributed in the entire circumferential direction about the support tower 1060.

The support tower 1060 is provided to be erect upward from the center of the heliostat field G. A solar heat receiver 1200 is provided at an upper portion of the support tower 1060. In the solar heat receiver 1200, sunlight reflected by the plurality of heliostats 1050 is focused, thereby heating a working fluid such as air which flows through the inside.

Figure 2:
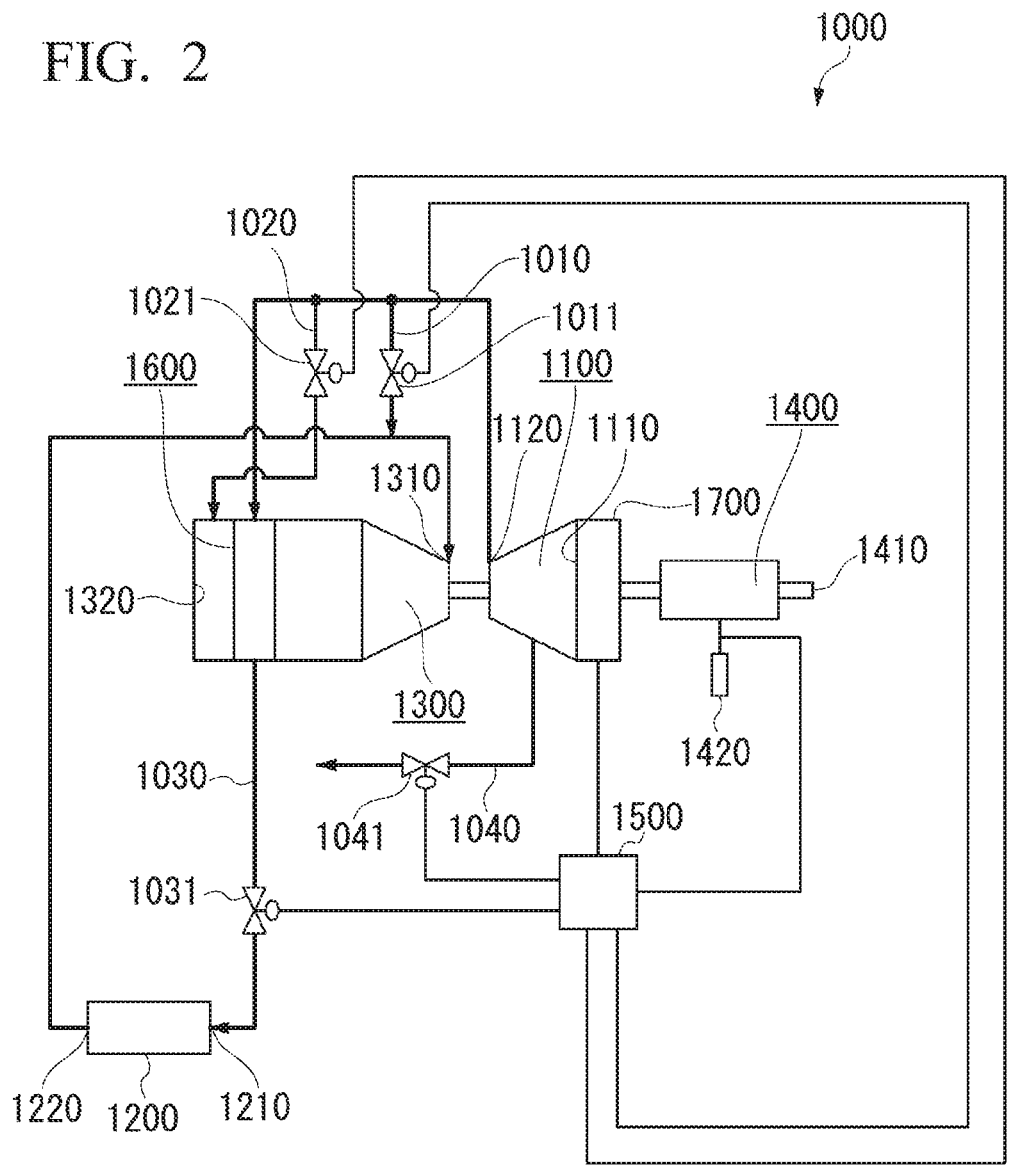
FIG. 2 is a schematic piping diagram showing a logical structure of the solar heat turbine system of the embodiment of the present invention.
Figure 3:
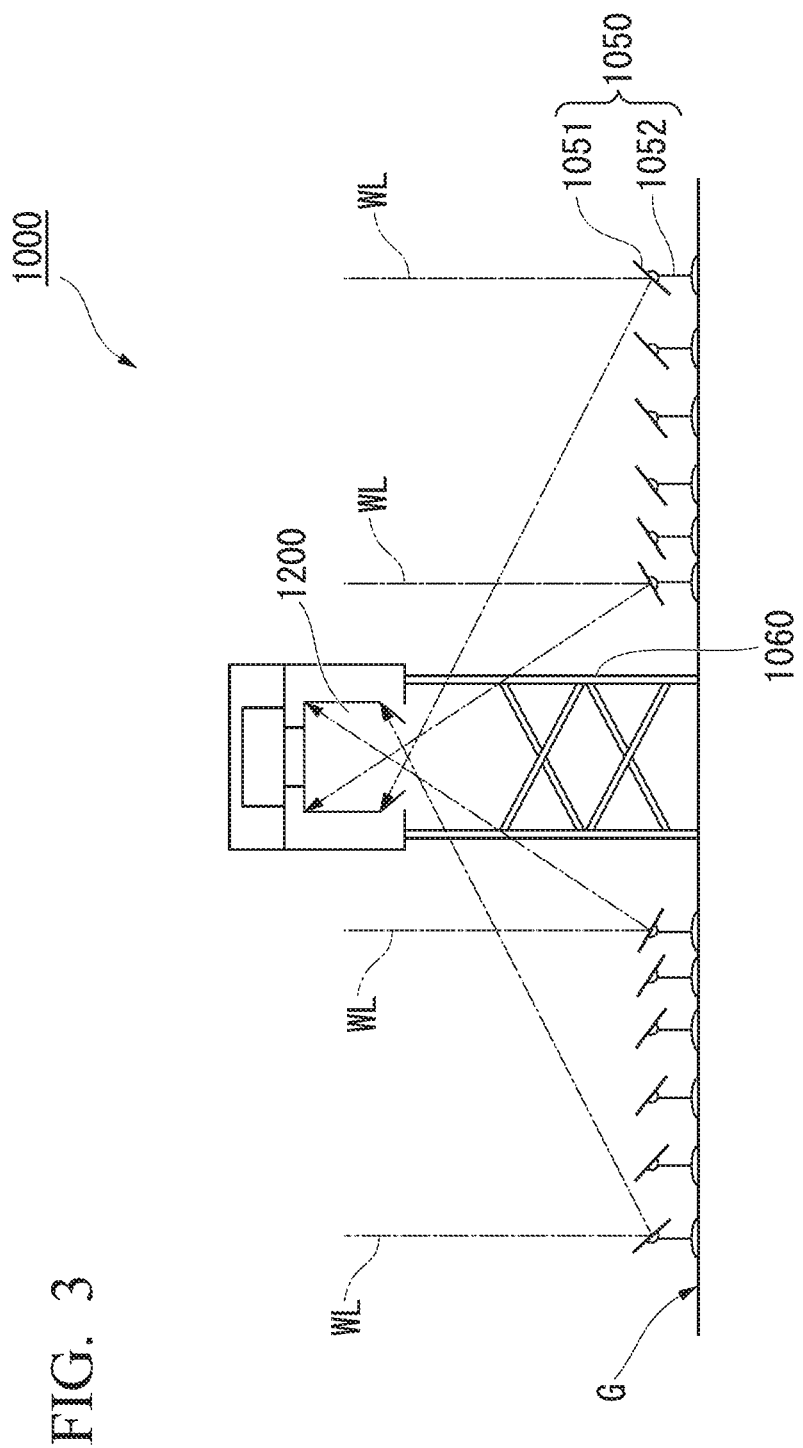
FIG. 3 is a schematic vertical section front view showing a physical structure of the solar heat turbine system of the embodiment of the present invention.
Figure 4:
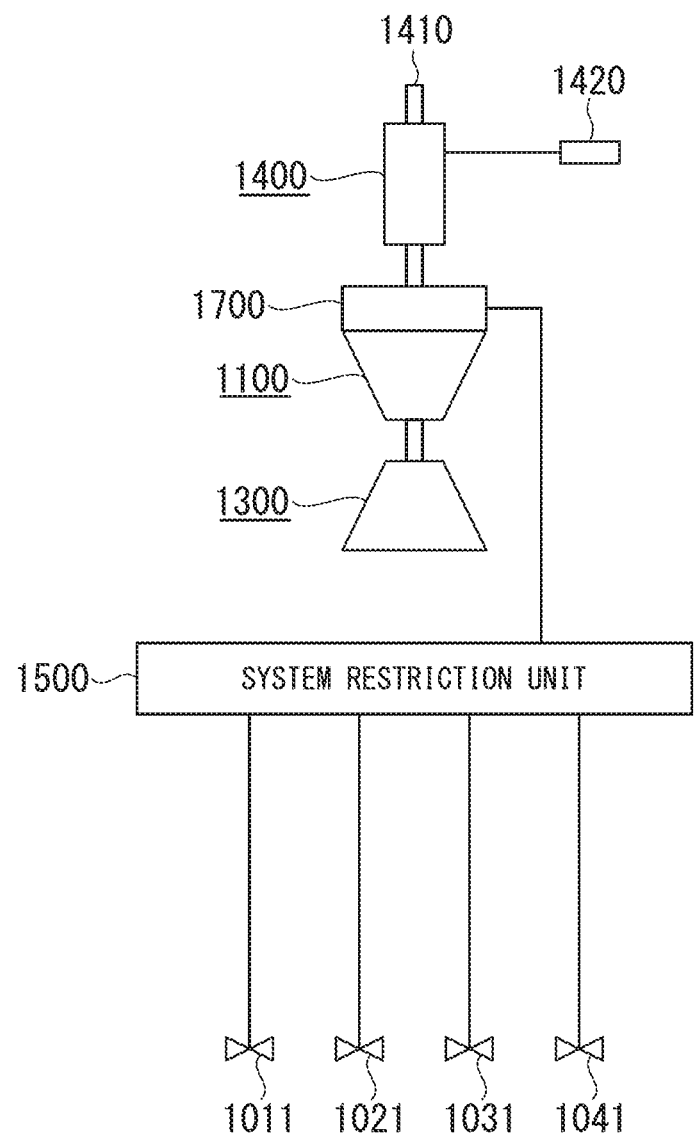
FIG. 4 is a block diagram showing a circuit structure of the solar heat turbine system of the embodiment of the present invention.

The solar heat turbine system 1000 of this embodiment has a compressor 1100, the solar heat receiver 1200, a turbine 1300, a power transmission shaft 1410 which is a rotation interlocking mechanism, a turbine generator 1400, power consumption equipment 1420, a system control device 1500, a working fluid reheater 1600, an IGV (Inlet Guide Vane) 1700 which is a compressor inlet guide vane, a high-pressure pipe 1030, a bleed tube 1040, and the like, as shown in FIG. 2.

The compressor 1100 is configured with a multistage compressor or the like, which is provided with a plurality of blades and a plurality of vanes and compresses air which is a working fluid in a multi-stage. The compressor 1100 is rotationally driven, thereby compressing the working fluid into a compressor inlet 1110 and flowing out the compressed working fluid from a compressor outlet 1120. The solar heat receiver 1200 heats a high-pressure working fluid which is compressed in the compressor 1100 and then flows into a heat receiver inlet 1210, with sunlight, as described above, and then flows out the working fluid as a high-temperature working fluid from a heat receiver outlet 1220.

Hereafter, in this embodiment, the working fluid flowing from the compressor outlet 1120 to the solar heat receiver 1200 will be described as being a "high-pressure working fluid" and the working fluid flowing from the heat receiver outlet 1220 to a turbine inlet 1310 (described later) will be described as being a "high-temperature working fluid".

The turbine 1300 is configured with an axial-flow turbine or the like, which is provided with a plurality of blades and a plurality of vanes. The turbine 1300 is rotationally driven by the high-temperature working fluid which flows from the solar heat receiver 1200 into the turbine inlet 1310 and then flows out from a turbine outlet 1320.

The turbine generator 1400 generates electric power by being rotationally driven by the turbine 1300 through the power transmission shaft 1410. The turbine generator 1400, the compressor 1100, and the turbine 1300 are coaxially connected so as to be able to rotate together through the power transmission shaft 1410, and therefore, the compressor 1100 and the turbine generator 1400 are rotationally driven by the drive force of the turbine 1300.

The power consumption equipment 1420 is an auxiliary machine necessary for an operation of the turbine system and is operated by consuming the electric power generated in the turbine generator 1400.

The system control device 1500 is composed of, for example, a microcomputer in which an appropriate computer program is implemented, a logic circuit which outputs a predetermined signal in response to input of a predetermined signal, or the like.

The working fluid reheater 1600 is configured with a heat exchanger or the like. The working fluid reheater 1600 preheats the high-pressure working fluid which flows out from the compressor 1100, by heat exchange with the high-temperature working fluid which flows out from the turbine 1300. The high-pressure pipe 1030 causes the high-pressure working fluid to flow from the compressor outlet 1120 of the compressor 1100 to the heat receiver inlet 1210 of the solar heat receiver 1200 via the working fluid reheater 1600.

The IGV 1700 is configured with a plurality of openable and closable vanes or the like. The IGV 1700 regulates the flow rate of the working fluid to the compressor 1100. As shown in FIG. 2, a bleed mechanism is configured with the bleed pipe 1040 and a bleed valve 1041. The bleed tube 1040 introduces the high-pressure working fluid which is in a process of being generated in the compressor 1100, as a bled working fluid, and bleeds the bled working fluid to the outside by opening the bleed valve 1041.

In addition, the solar heat turbine system 1000 of this embodiment further has a heat receiver bypass tube 1010 which causes the high-pressure working fluid to bypass from the compressor outlet 1120 of the compressor 1100 to the turbine inlet 1310 of the turbine 1300, and a heat receiver bypass valve 1011 which opens and closes the heat receiver bypass tube 1010.

In addition, the solar heat turbine system 1000 of this embodiment further has a turbine bypass tube 1020 and a turbine bypass valve 1021, as shown in FIG. 2. The turbine bypass tube 1020 causes the high-pressure working fluid to bypass from the compressor outlet 1120 of the compressor 1100 to the turbine outlet 1320 of the turbine 1300. The turbine bypass valve 1021 opens and closes the turbine bypass tube 1020.

In addition, the solar heat turbine system 1000 of this embodiment further has a flow rate adjusting valve 1031 and a bleed valve 1041. The flow rate adjusting valve 1031 opens and closes the high-pressure pipe 1030. The bleed valve 1041 opens and closes the bleed tube 1040.

Then, the system control device 1500 of the solar heat turbine system 1000 of this embodiment detects a trip which occurs due to abnormality or the like of, for example, the turbine system or a power supply system, as a stop request.

Then, if the stop request is generated, the system control device 1500 which has detected the occurrence of the trip in this manner restricts at least one of the flows of the high-pressure working fluid and the high-temperature working fluid and then executes bleeding.

For this reason, if the stop request is generated, the system control device 1500 immediately opens the heat receiver bypass valve 1011. Further, if the stop request is generated, the system control device 1500 immediately opens the turbine bypass valve 1021. Further, if the stop request is generated, the system control device 1500 immediately regulates the flow rate adjusting valve 1031 in a closing direction.

For this reason, it is possible to immediately reduce the pressure and the flow rate of the high-temperature working fluid which flows into the turbine 1300, and therefore, the drive force of the turbine 1300 by the high-temperature working fluid can also be immediately reduced. As a result, even in a case where an electrical load has disappeared due to a trip, an increase in rotational frequency of the turbine 1300 and the compressor 1100 and the turbine generator 1400 which are driven by the turbine 1300 is suppressed. For this reason, the turbine system 1000 can be prevented from being damaged due to over-speed.

Further, the system control device 1500 speeds up the compressor 1100 with small speed-up energy in a speed-up process, and opens the bleed valve 1041 in order to prevent surging, and thereafter closes the bleed valve 1041.

On the other hand, if the stop request is generated, regulation in an opening direction is performed for prevention of over-speed or surging. More specifically, after the elapse of a predetermined time after the stop request is generated, the bleed valve 1041 is opened.

For this reason, the high-pressure working fluid is not bled as a bled working fluid for a predetermined time after the stop request is generated. That is, the flow rate of the working fluid which is compressed in the compressor 1100 is not reduced immediately, and therefore, a drive force necessary for the driving of the compressor 1100 is also not reduced immediately.

As a result, the drive force of the turbine 1300 is more consumed by the compressor 1100 than in a case where the bleed valve 1041 is not immediately opened after the stop request is generated, and therefore, an increase in rotational frequency of the compressor 1100, the turbine 1300, and the turbine generator 1400 is suppressed.

On the other hand, if a predetermined time has elapsed after the stop request is generated, the bleed valve 1041 is opened, and therefore, the high-pressure working fluid is bled as a bled working fluid. For this reason, the internal pressure of the compressor 1100 is reduced, and therefore, surging of the compressor 1100 can be prevented.

For this reason, the turbine system 1000 can be prevented from being damaged due to over-speed or surging.

Further, if the stop request is generated, the system control device 1500 regulates the IGV 1700 in a closing direction. More specifically, if the stop request is generated, the IGV 1700 is closed after the elapse of a predetermined time.

For this reason, the IGV 1700 is not regulated in a closing direction for a predetermined time after the stop request is generated, and therefore, the flow rate of the working fluid which is compressed in the compressor 1100 is not reduced immediately. That is, the drive force necessary for the driving of the compressor 1100 is also not reduced immediately.

As a result, the drive force of the turbine 1300 is more consumed by the compressor 1100 than in a case where the IGV 1700 is immediately regulated in a closing direction after the stop request is generated, and therefore, an increase in rotational frequency of the compressor 1100, the turbine 1300, and the turbine generator 1400 is suppressed.

For this reason, the turbine system 1000 can be prevented from being damaged due to over-speed. On the other hand, if a predetermined time has elapsed after the stop request is generated, the IGV 1700 is closed, and therefore, the inflow of the working fluid to the compressor 1100 is reduced.

For this reason, the internal pressure of the compressor 1100 is reduced, and therefore, surging of the compressor 1100 can be prevented. Therefore, the turbine system 1000 can be prevented from being damaged due to over-speed or surging.

As described above, in a case where the system control device 1500 is composed of the microcomputer, the computer program thereof is designed so as to cause the solar heat turbine system 1000 to execute bleeding after the flows of the high-pressure working fluid and the high-temperature working fluid are restricted, if the stop request is generated, as described above.

Figure 1:
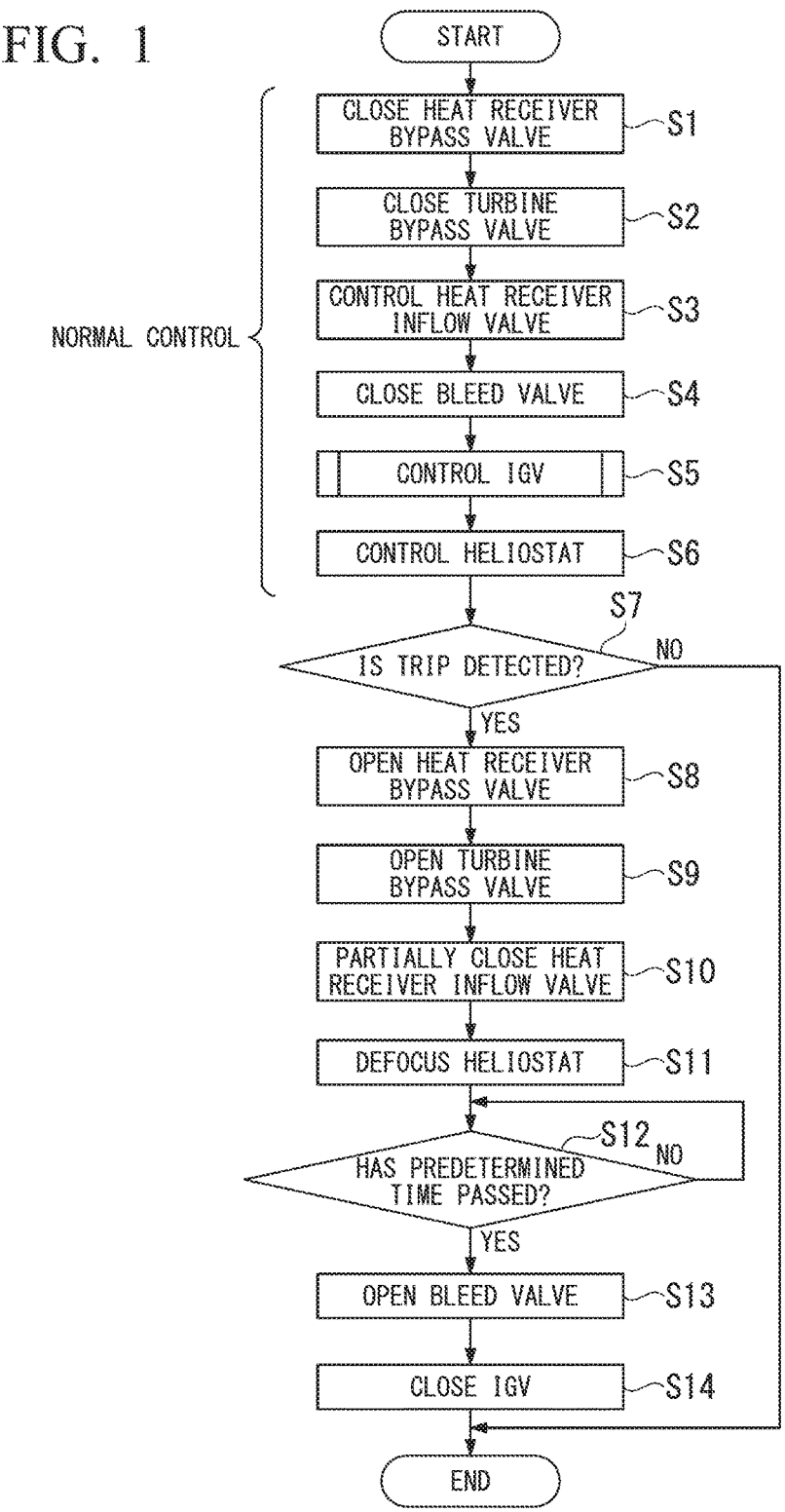
FIG. 1 is a flowchart showing a system control method by a computer program of a system control device of a solar heat turbine system of an embodiment of the present invention.

More specifically, such a computer program is designed so as to cause the solar heat turbine system 1000 to regulate the flow rate of the working fluid to the compressor 1100 by the IGV 1700, opening the heat receiver bypass valve 1011 if the stop request is generated, opening the turbine bypass valve 1021 if the stop request is generated, regulating the flow rate adjusting valve 1031 in a closing direction, opening the bleed valve 1041 after the elapse of a predetermined time from the generation of the stop request, closing the IGV 1700 after the elapse of a predetermined time from the generation of the stop request, and the like, as shown in FIG. 1.

In the configuration as described above, an operation of the solar heat turbine system 1000 of this embodiment will be described hereinafter. In addition, as shown in FIGS. 5A to 6B, in the following, description will be made of a normal operation being executed at a time of "9:59 to 10:00" and a trip occurring at "10:00".

Figure 5A:
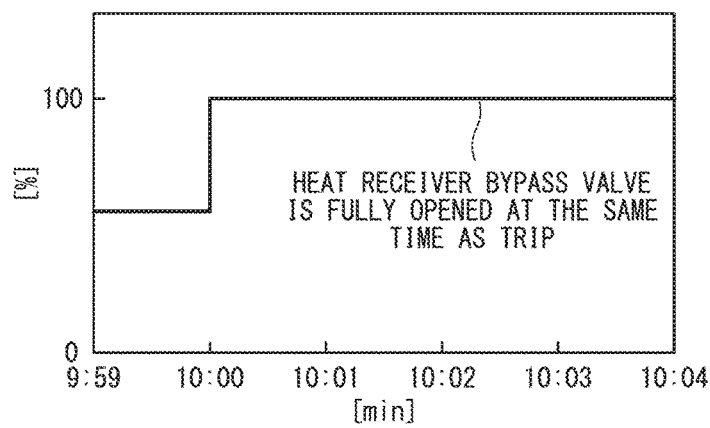
FIG. 5A is a temporal graph showing opening degree changes of a heat receiver bypass valve, a turbine bypass valve, and a flow rate adjusting valve of the solar heat turbine system of the embodiment of the present invention.

In the solar heat turbine system 1000 of this embodiment, as shown in FIG. 1, as the initial setting, as shown at a time of "9:59 to 10:00" of FIG. 5A, the heat receiver bypass tube 1010 is closed by the heat receiver bypass valve 1011 (Step S1).

Figure 5B:
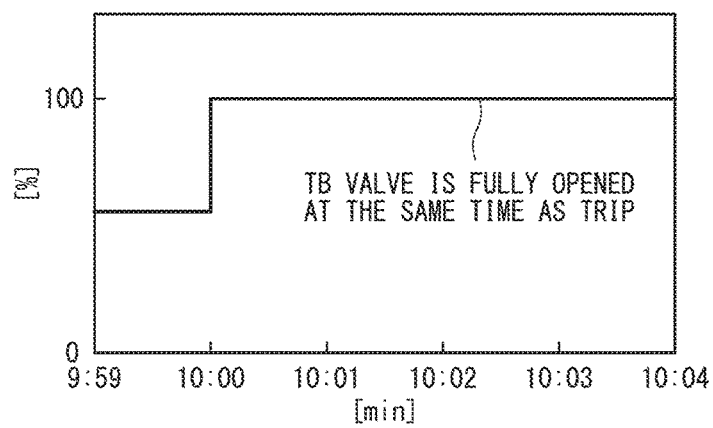
FIG. 5B is a temporal graph showing opening degree changes of the heat receiver bypass valve, the turbine bypass valve, and the flow rate adjusting valve of the solar heat turbine system of the embodiment of the present invention.
Figure 5C:
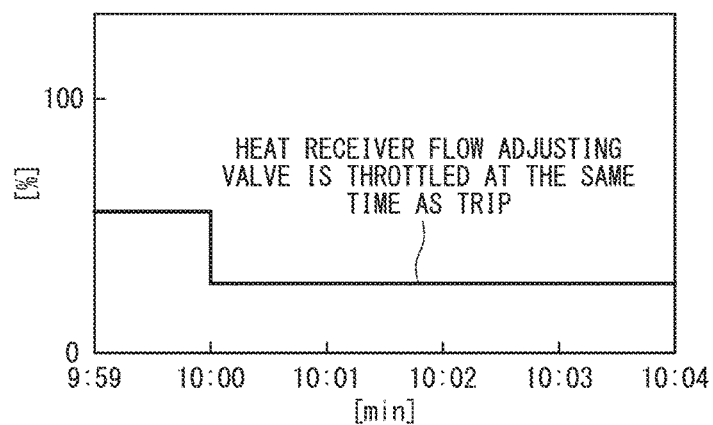
FIG. 5C is a temporal graph showing opening degree changes of the heat receiver bypass valve, the turbine bypass valve, and the flow rate adjusting valve of the solar heat turbine system of the embodiment of the present invention.

Further, as shown at a time of "9:59 to 10:00" of FIG. 5B, the turbine bypass tube 1020 is closed by the turbine bypass valve 1021 (Step S2), and as shown at a time of "9:59 to 10:00" of FIG. 5C, the high-pressure pipe 1030 is controlled by the flow rate adjusting valve 1031 (Step S3), and the bleed tube 1040 is closed by the bleed valve 1041 (Step S4).

Figure 6A:
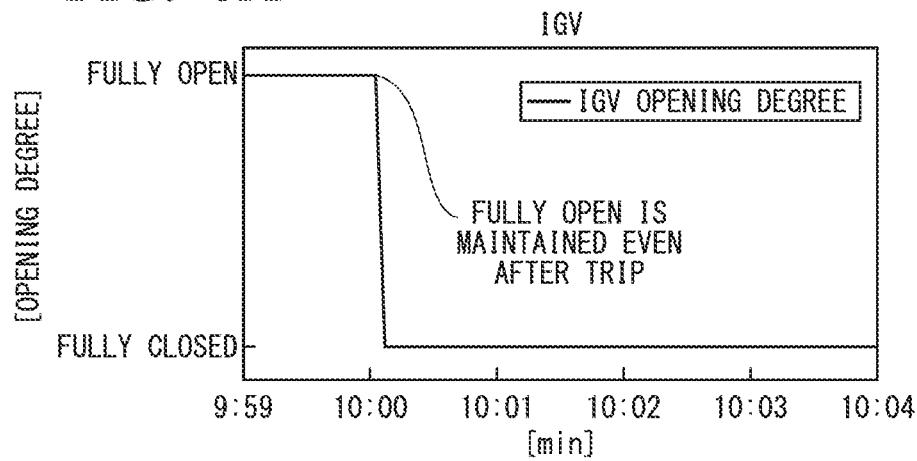
FIG. 6A is a temporal graph showing the flow rate of a bleed tube and a compressor inlet guide vane and a change in a rotation speed of a turbine or the like of the solar heat turbine system of the embodiment of the present invention.

Further, the IGV 1700 is controlled in an opening direction (Step S5), whereby the flow rate of the working fluid to the compressor 1100 is regulated, as shown in FIG. 6A, and the plurality of heliostats 1050 are controlled (Step S6).

In the state as described above, as shown in FIG. 2, sunlight WL is focused on the solar heat receiver 1200 by the plurality of heliostats 1050, and the solar heat receiver 1200 is heated to a high temperature by the focused sunlight.

Figure 6B:
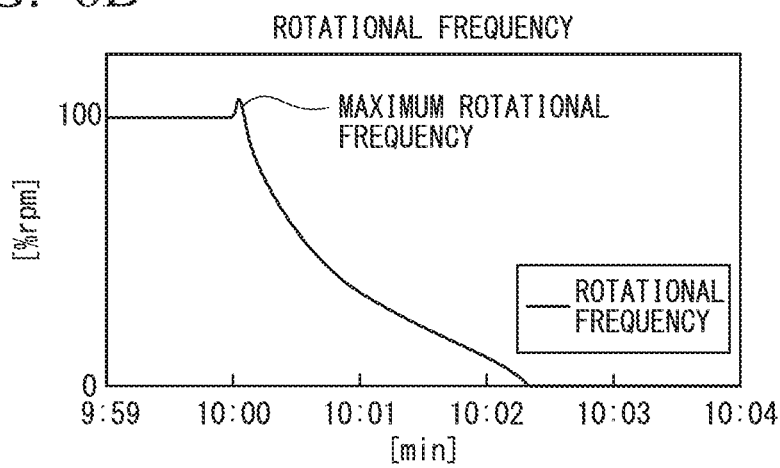
FIG. 6B is a temporal graph showing the flow rate of the bleed tube and the compressor inlet guide vane and a change in the rotation speed of the turbine or the like of the solar heat turbine system of the embodiment of the present invention.

An input working fluid is heated by the solar heat receiver 1200, whereby a high-temperature working fluid is generated, and therefore, as shown at a time of "9:59 to 10:00" of FIG. 6B, the compressor 1100 and the turbine generator 1400 are rotated along with the turbine 1300 by the heat energy (and the kinetic energy) thereof.

In a state where the heat receiver bypass valve 1011, the flow rate adjusting valve 1031, the bleed valve 1041, and the IGV 1700 have been controlled as described above, in the solar heat turbine system 1000, the working fluid to the compressor inlet 1110 of the compressor 1100 which is rotationally driven is compressed and then flows out from the compressor outlet 1120.

The generated high-pressure working fluid flows into the heat receiver inlet 1210 of the solar heat receiver 1200, is heated with sunlight, and then flows out from the heat receiver outlet 1220. The high-temperature working fluid rotationally drives the turbine 1300 by flowing into the turbine inlet 1310 of the turbine 1300 and then flowing out from the turbine outlet 1320.

The power transmission shaft 1410 connected to the turbine 1300 which is rotationally driven rotationally drives the compressor 1100. The turbine generator 1400 which is rotationally driven by the compressor 1100 which is rotationally driven generates electric power.

For this reason, if the solar heat turbine system 1000 of this embodiment continues to generate electric power in a chain reaction with sunlight as an energy source, if it is started up, as shown at a time of "9:59 to 10:00" of FIG. 6B.

In particular, in the solar heat turbine system 1000, the working fluid reheater 1600 preheats the high-pressure working fluid which flows out from the compressor 1100, by heat exchange with the high-temperature working fluid which flows out from the turbine 1300, and therefore, it is possible to improve thermal efficiency.

However, in the solar heat turbine system 1000 of this embodiment, in the power generation state as described above, for example, an electrical connection state between the turbine generator 1400 and the power consumption equipment 1420 is monitored by the system control device 1500.

Then, if the system control device 1500 detects a trip as the stop request at "10:00" due to abnormality or the like of the turbine system or the power supply system (Step S7—Y), as shown in FIG. 5A, the heat receiver bypass tube 1010 is opened by the heat receiver bypass valve 1011 (Step S8).

Further, as shown in FIG. 5B, the turbine bypass tube 1020 is opened by the turbine bypass valve 1021 (Step S9), and as shown in FIG. 5C, the high-pressure pipe 1030 is closed by the flow rate adjusting valve 1031 (Step S10). Further, the plurality of heliostats 1050 are controlled such that the reflected sunlight WL is not focused on the solar heat receiver 1200 (Step S11).

Then, if the elapse of a predetermined time from the occurrence of the trip is detected (Step S12—Y), the bleed tube 1040 is opened by the bleed valve 1041 (Step S13), and as shown in FIG. 6A, the IGV 1700 is closed (Step S14).

For this reason, in the solar heat turbine system 1000 of this embodiment, if the system control device 1500 detects the trip, opening the turbine bypass valve 1021, regulating the flow rate adjusting valve 1031 in a closing direction, opening the bleed valve 1041 after the elapse of a predetermined time, and closing the IGV 1700 after the elapse of a predetermined time are executed, as described above.

For this reason, the outflow of the working fluid from the compressor 1100, the inflow of the working fluid to the solar heat receiver 1200, and the inflow of the working fluid to the turbine 1300 are restricted, and therefore, it is possible to immediately restrict the driving energy of the solar heat turbine system 1000.

Further, as described above, after a fluid cycle composed of compression by the compressor 1100, heating by the solar heat receiver 1200, and driving of the turbine 1300 is immediately restricted, the high-pressure working fluid which is in a process of being generated in the compressor 1100 is bled at a predetermined timing.

For this reason, even if the trip occurs, bleeding is not executed immediately, and therefore, this serves as a load, whereby an increase in the rotation speed of the compressor 1100 can be suppressed, and it is possible to satisfactorily prevent over-speed of the compressor 1100, the turbine 1300, and the turbine generator 1400.

Further, since bleeding is performed at a predetermined timing after the trip occurs, it is possible to reduce the pressure of the high-pressure working fluid which the compressor 1100 flows out. For this reason, it is possible to satisfactorily prevent surging of the compressor 1100 in which over-speed has been prevented, as described above.

In particular, if the stop request is generated, the bleed valve 1041 is opened after the elapse of a predetermined time, and therefore, it is possible to automatically reduce the pressure of the high-pressure working fluid which the compressor 1100 flows out, at an optimum timing.

Further, if the stop request is generated, the IGV 1700 is regulated in a closing direction, and therefore, the working fluid to the turbine 1300 is reduced, and thus it is possible to prevent over-speed or the like of the compressor 1100, the turbine 1300, and the turbine generator 1400.

In particular, if the stop request is generated, the IGV 1700 is closed after the elapse of a predetermined time, and therefore, it is possible to automatically reduce the working fluid to the turbine 1300 at an optimum timing.

Further, if the stop request is generated, the heat receiver bypass valve 1011 is opened, and thus the heat receiver bypass tube 1010 causes the high-pressure working fluid to bypass from the compressor outlet 1120 of the compressor 1100 to the turbine inlet 1310 of the turbine 1300.

For this reason, if the trip occurs, the inflow of the high-pressure working fluid to the solar heat receiver 1200 is reduced, and thus it is possible to prevent over-speed or surging of the compressor 1100, the turbine 1300, and the turbine generator 1400.

Further, if the stop request is generated, the turbine bypass valve 1021 is opened, and thus the turbine bypass tube 1020 causes the high-pressure working fluid to bypass from the compressor outlet 1120 of the compressor 1100 to the turbine outlet 1320 of the turbine 1300.

For this reason, the pressure of the high-pressure working fluid which the compressor 1100 flows out is reduced, and thus, it is possible to prevent over-speed or surging of the compressor 1100, the turbine 1300, and the turbine generator 1400.

Further, if the stop request is generated, the flow rate adjusting valve 1031 is controlled in a closing direction, and thus the flow of the high-pressure working fluid by the high-pressure pipe 1030 from the compressor outlet 1120 of the compressor 1100 to the heat receiver inlet 1210 of the solar heat receiver 1200 is reduced.

For this reason, the inflow of the high-pressure working fluid to the solar heat receiver 1200 is reduced, and thus it is possible to prevent over-speed or surging of the compressor 1100, the turbine 1300, and the turbine generator 1400.

Further, if the stop request is generated, the flow rate adjusting valve 1031 is regulated in a closing direction, and thus the flow of the high-pressure working fluid by the high-pressure pipe 1030 from the compressor outlet 1120 of the compressor 1100 to the heat receiver inlet 1210 of the solar heat receiver 1200 via the working fluid reheater 1600 is reduced.

For this reason, the pressure of the high-pressure working fluid which the compressor 1100 flows out is reduced, and thus it is possible to prevent over-speed or surging of the compressor 1100, the turbine 1300, and the turbine generator 1400.

Further, if the stop request is generated, the bleed valve 1041 which is opened at the time of start-up and closed after the start-up is regulated in an opening direction, thereby causing a part of the high-pressure working fluid generated in the compressor 1100 to bypass the turbine 1300.

For this reason, the pressure of the high-pressure working fluid which the compressor 1100 flows out is reduced, and thus it is possible to prevent over-speed or surging of the compressor 1100, the turbine 1300, and the turbine generator 1400.

Further, it is possible to prevent over-speed or surging of the compressor 1100, the turbine 1300, and the turbine generator 1400 by using the existing bleed valve 1041, the existing IGV 1700, the existing heat receiver bypass valve 1011, the existing turbine bypass valve 1021, the existing flow rate adjusting valve 1031, and the like, and therefore, it is possible to minimize addition of dedicated facilities.

Further, the system control device 1500 is composed of a microcomputer in which an appropriate computer program is implemented, and therefore, for example, even in a case where a bypass tube, a bypass valve, or the like is increased or reduced, it is possible to easily cope with it by updating the computer program.

Further, if the stop request is generated, after the elapse of a predetermined time, opening of the bleed valve 1041 and closing of the IGV 1700 are performed. However, it is possible to easily set and change even the predetermined time in the computer program of the system control device 1500.

In addition, the present invention is not limited to this embodiment, and various modifications are permitted within a scope which does not depart from the gist of the present invention. For example, in the solar heat turbine system 1000 of the above embodiment, a configuration has been exemplified in which if a predetermined time has elapsed after the stop request is generated, opening of the bleed valve 1041 and closing of the IGV 1700 are performed.

However, opening of the bleed valve 1041 and closing of the IGV 1700 may be performed in response to a timing when the rotation speed of the turbine 1300 or the like has changed from an increase to a decrease after the stop request is generated.

Further, opening of the bleed valve 1041 and closing of the IGV 1700 may be performed in response to a timing when the rotation speed of the turbine 1300 or the like has been reduced to a predetermined value after the stop request is generated.

Further, in the solar heat turbine system 1000 of the embodiment described above, a configuration has been exemplified in which if the stop request is generated, all of the outflow of the working fluid from the compressor 1100, the inflow of the working fluid to the solar heat receiver 1200, and the inflow of the working fluid to the turbine 1300 is restricted. However, one or two of the outflow of the working fluid from the compressor 1100, the inflow of the working fluid to the solar heat receiver 1200, and the inflow of the working fluid into the turbine 1300 may be restricted.

Further, in this embodiment, a configuration in which the system control device 1500 of the solar heat turbine system 1000 logically realizes various functions by a computer program has been exemplified. However, the system control device 1500 can also be formed as specific hardware and can also be realized as the combination of software and hardware.

In addition, of course, the embodiment and a plurality of modification examples described above can be combined to the extent that the contents thereof do not conflict with each other. Further, in the embodiment and the modification examples described above, the structure and the like of each part have been specifically described. However, the structure and the like can be variously changed within a scope satisfying the present invention.

INDUSTRIAL APPLICABILITY

According to the solar heat turbine system described above, and the device and the method for controlling the system, for example, if the stop request is generated in the solar heat turbine system, a restriction mechanism restricts the flow of at least one of the high-pressure working fluid and the high-temperature working fluid. For this reason, it is possible to restrict the energy of at least one of the high-pressure working fluid and the high-temperature working fluid which operate the solar heat turbine system.

REFERENCE SIGNS LIST

1000: solar heat turbine system
1010: heat receiver bypass tube
1011: heat receiver bypass valve
1020: turbine bypass tube
1021: turbine bypass valve
1030: high-pressure pipe
1031: flow rate adjusting valve
1040: bleed tube
1041: bleed valve
1100: compressor
1110: compressor inlet
1120: compressor outlet
1200: solar heat receiver
1210: heat receiver inlet
1220: heat receiver outlet
1300: turbine
1310: turbine inlet
1320: turbine outlet
1400: turbine generator
1410: power transmission shaft
1420: power consumption equipment
1500: system control device
1600: working fluid reheater
1700: IGV (Inlet Guide Vane) which is a compressor inlet guide vane

The invention claimed is:

1. A solar heat turbine system comprising:
  a compressor configured to compress a working fluid by rotational drive, and configured to generate a high-pressure working fluid;
  a solar heat receiver configured to heat the high-pressure working fluid with solar heat, and configured to generate a high-temperature working fluid;
  a turbine configured to be rotationally driven by the high-temperature working fluid;
  a restriction mechanism configured to restrict a flow of at least one of the high-pressure working fluid and the high-temperature working fluid;
  a rotation interlocking mechanism configured to rotationally drive the compressor so as to interlock with the turbine which is rotationally driven;
  a bleed mechanism configured to cause the high-pressure working fluid which is in a process of being generated in the compressor to be bled as a bled working fluid; and
  a system control unit configured to cause the bleed mechanism to execute bleeding after the restriction mechanism is caused to restrict at least one of the flows of the high-pressure working fluid and the high-temperature working fluid, if a stop request is generated,
  wherein the system control unit causes the bleed mechanism to execute bleeding in response to a timing when a rotation speed of the compressor has changed from an increase to a decrease, after the generation of the stop request.

2. The solar heat turbine system according to claim 1, wherein the system control unit causes the bleed mechanism to execute bleeding after the generation of the stop request.

3. The solar heat turbine system according to claim 1, wherein the system control unit causes the bleed mechanism to execute bleeding in response to a timing when a rotation speed of the compressor has been reduced to a predetermined value, after the generation of the stop request.

4. The solar heat turbine system according to claim 1, further comprising:
  a heat receiver bypass unit configured to cause the high-pressure working fluid to bypass the solar heat receiver from the compressor to the turbine,
  wherein the system control unit operates the heat receiver bypass unit if the stop request is generated.

5. The solar heat turbine system according to claim 1, wherein the bleed mechanism has a bleed valve which discharges the high-pressure working fluid to the outside, and
  wherein the system control unit operates the bleed valve if the stop request is generated.

6. The solar heat turbine system according to claim 1, further comprising:
  a compressor inlet guide vane configured to regulate a flow rate of the working fluid to the compressor,
  wherein the system control unit regulates the compressor inlet guide vane in a closing direction if the stop request is generated.

7. The solar heat turbine system according to claim 6, wherein the system control unit closes the compressor inlet guide vane after the restriction mechanism is caused to restrict at least one of the flows of the high-pressure working fluid and the high-temperature working fluid.

8. The solar heat turbine system according to claim 1, further comprising:
a generator configured to generate electric power by being rotationally driven by at least one of the compressor and the turbine.

9. A system control device that controls a solar heat turbine system which includes a compressor configured to compress a working fluid, and configured to generate a high-pressure working fluid, a solar heat receiver configured to heat the high-pressure working fluid with solar heat, and configured to generate a high-temperature working fluid, and a turbine configured to be rotationally driven by the high-temperature working fluid, the system control device comprising:
a restriction mechanism configured to restrict a flow of at least one of the high-pressure working fluid and the high-temperature working fluid; and
a bleed mechanism configured to cause the high-pressure working fluid which is in a process of being generated in the compressor to be bled as a bled working fluid,
wherein the bleed mechanism is caused to execute bleeding in response to a timing when a rotation speed of the compressor has changed from an increase to a decrease, after the restriction mechanism is caused to restrict at least one of the flows of the high-pressure working fluid and the high-temperature working fluid, if a stop request is generated.

10. A system control method of a solar heat turbine system which includes a compressor configured to compress a working fluid, and configured to generate a high-pressure working fluid, a solar heat receiver configured to heat the high-pressure working fluid with solar heat, and configured to generate a high-temperature working fluid, and a turbine configured to be rotationally driven by the high-temperature working fluid and coupled so as to be able to rotate along with the compressor, wherein the solar heat turbine system is provided with a restriction mechanism configured to restrict a flow of at least one of the high-pressure working fluid and the high-temperature working fluid, and a bleed mechanism configured to cause the high-pressure working fluid which is in a process of being generated in the compressor to be bled as a bled working fluid, the system control method comprising the step of:
performing a first step for restricting the flow of at least one of the high-pressure working fluid and the high-temperature working fluid by the restriction mechanism according to generation of a stop request, and
performing a second step for bleeding in response to a timing when a rotation speed of the compressor has changed from an increase to a decrease, the high-pressure working fluid which is in a process of being generated in the compressor by the bleed mechanism after the first step is performed.

* * * * *